United States Patent [19]

McMillan et al.

[11] 4,191,724
[45] Mar. 4, 1980

[54] MOLDED CHARACTER BELT WITH INTEGRAL SLEEVES

[75] Inventors: Norman McMillan, Westlake Village; Henry M. Dier, Woodland Hills, both of Calif.

[73] Assignee: Dataproducts Corporation, Woodland Hills, Calif.

[21] Appl. No.: 790,999

[22] Filed: Apr. 26, 1977

Related U.S. Application Data

[62] Division of Ser. No. 639,349, Dec. 10, 1975, abandoned.

[51] Int. Cl.² .......................... B29C 5/04; B29D 3/02; B29H 7/22
[52] U.S. Cl. .................................. 264/255; 264/275; 264/310
[58] Field of Search ................. 101/111, 401.1, 401.2; 264/259, 271, 299, 279, 275, 255, 250, 310, 311; 425/115, 123, 127, 129; 164/139, 143; 249/137, 138, 154

[56] References Cited

U.S. PATENT DOCUMENTS

| | | | |
|---|---|---|---|
| 2,762,297 | 9/1956 | Baer | 101/111 |
| 3,103,703 | 9/1963 | Ludewig | 264/275 |
| 3,109,202 | 11/1963 | Beckadolph et al. | 264/275 |
| 3,418,929 | 12/1968 | Nelson | 101/401.1 |
| 3,537,193 | 11/1970 | Bernier et al. | 264/275 |
| 3,683,802 | 8/1972 | Hepner et al. | 101/111 |
| 3,760,719 | 9/1973 | Torrens et al. | 101/111 |
| 3,845,711 | 11/1974 | Helms | 101/111 |

FOREIGN PATENT DOCUMENTS

744907 2/1956 United Kingdom ..................... 269/275

*Primary Examiner*—Willard E. Hoag
*Attorney, Agent, or Firm*—Freilich, Hornbaker, Wasserman, Rosen & Fernandez

[57] ABSTRACT

A character belt for use in a high speed impact printer comprises an endless band having an outer surface on which equally spaced cylindrical sleeves are formed so as to surround central portions of cylindrical slugs extending across the width of the band. Each slug has a raised type character on at least one end face thereof. The band and sleeves are integrally formed in a molding operation which yields a band which is relatively flexible about an axis extending parallel to the band's axial direction and relatively rigid about a line coincident with the circumference of the band. The plastic material selected to form the belt preferably exhibits good elastic damping characteristics and high abrasion resistance along the band inner surface. A high tensile strength core material is embedded in the band for dimensional stability.

4 Claims, 7 Drawing Figures

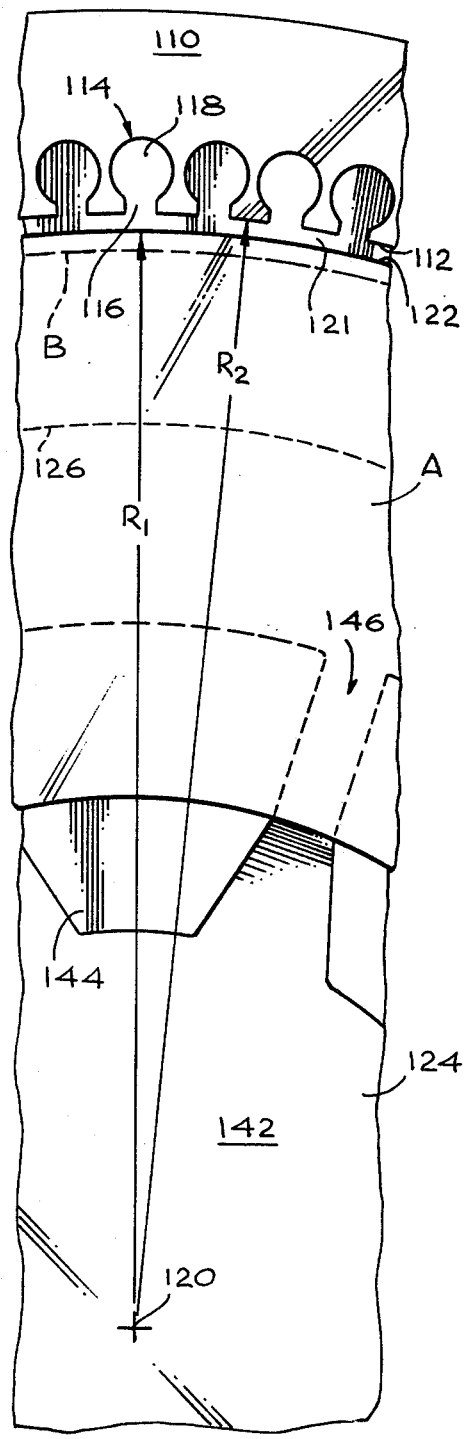
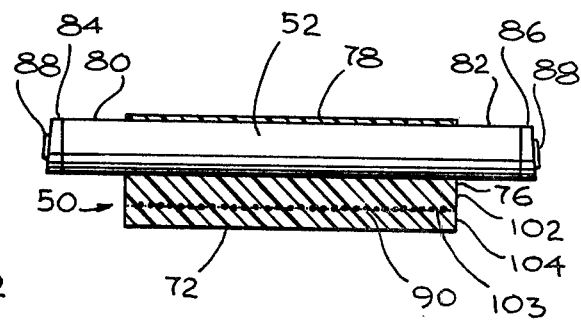
Fig. 4
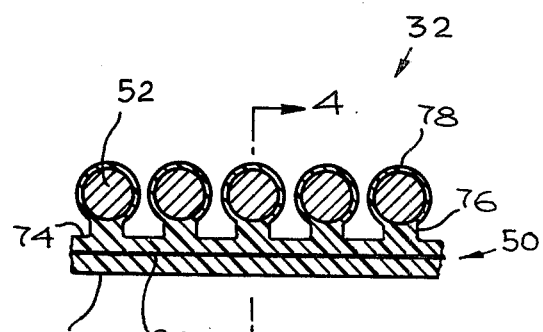
Fig. 3
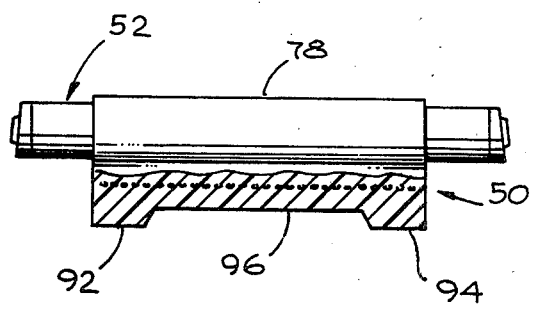
Fig. 5
Fig. 6

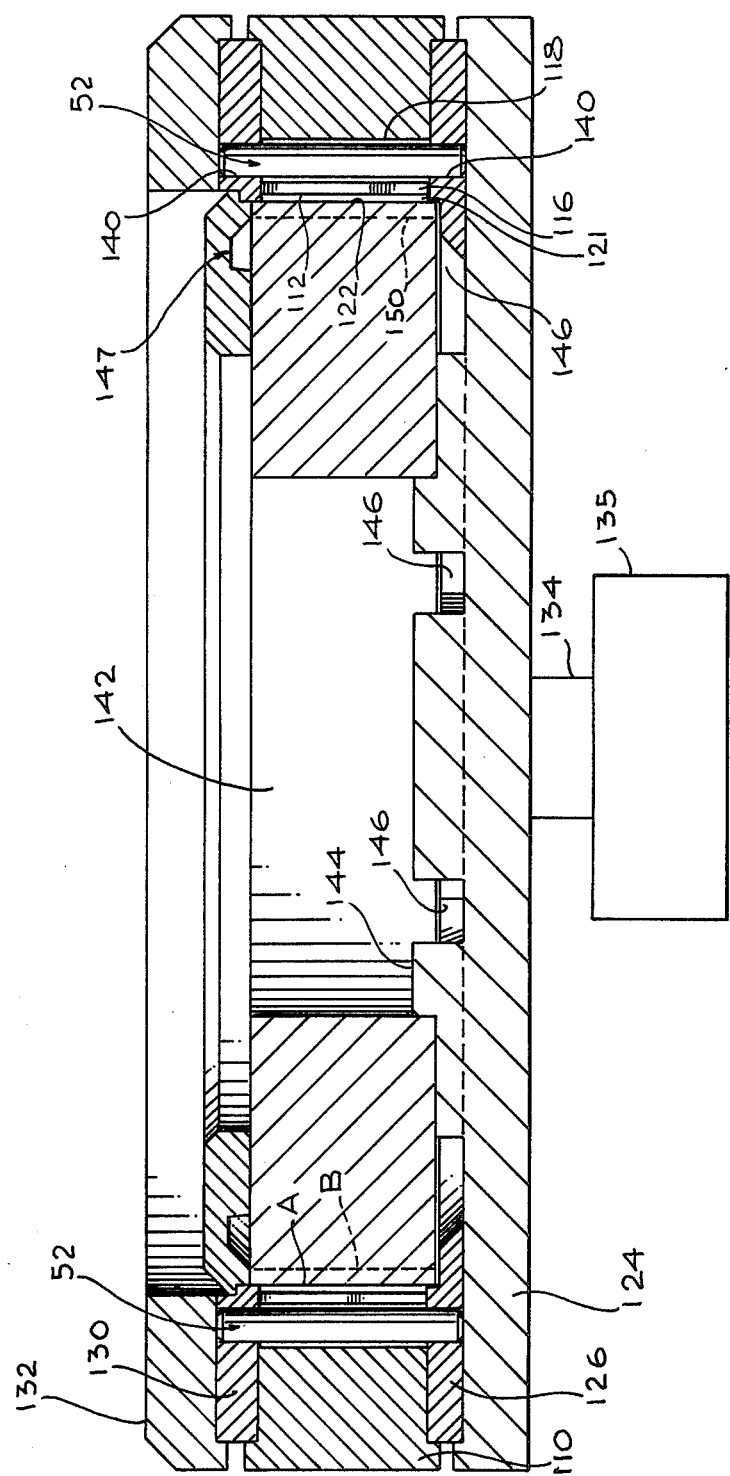

MOLDED CHARACTER BELT WITH INTEGRAL SLEEVES

This a division of application Ser. No. 639,349, filed Dec. 10, 1975, now abandoned.

BACKGROUND OF THE INVENTION

This invention relates generally to high speed impact printers and, more particularly, to an improved type bearing assembly for use therein, and to a method of fabricating such a type bearing assembly.

U.S. Pat. No. 3,845,711 and the references cited therein disclose high speed impact printers utilizing flexible band assemblies for moving type characters along a row of individually actuatable hammers. In U.S. Pat. No. 3,845,711, the band is supported on a low friction roadbed and carries on its outer surface a plurality of equally spaced parallel elongated slugs which extend across the width of the band. Each slug has a type character formed on its end face, which can be impacted by an actuated hammer as the character moves past it. The band with the character carrying slugs is often referred to as a character belt.

For proper performance it is important that the slugs be equally spaced along the length of the band, and that the slug end faces carrying type characters reside in a substantially common plane essentially parallel to the common plane defined by the hammer impact faces. It is also important to minimize the amount of energy transferred to the band upon impact by a hammer against a slug end face and to further minimize energy transfer between an impacted slug and any adjacent slug. Furthermore, it is highly desirable to minimize the cost of fabricating a character belt having all of the above recited properties.

SUMMARY OF THE INVENTION

The present invention is directed to an improved character belt comprised of cylindrical slugs securely bonded within equally spaced sleeves extending from the outer surface of an endless band. The band and sleeves are molded from a material having good elastic damping qualities to form a unitary structure. Prior to molding, the slugs are positioned in a molding apparatus so as to form the sleeves around the slugs thereby securely bonding the slugs thereto.

In accordance with another aspect of the invention, in order to define a precise belt diameter, a high tensile strength core material is embedded in the band.

In accordance with a further aspect of the invention, a layer of material exhibiting relatively high abrasion resistance properties is molded to the inner surface of the band.

The novel features of the invention are set forth with particularity in the appended claims. The invention will best be understood from the following description when read in conjunction with the accompanying drawings.

BRIEF DESCRIPTION OF THE DRAWINGS

FIG. 3 is a front sectional view of a portion of one embodiment of the character belt;

FIG. 4 is a cross-sectional view taken substantially along the plan 4—4 of FIG. 3;

FIG. 5 is a cross-sectional view of another embodiment of the character belt in accordance with the present invention;

FIG. 6 is a top plan view showing a portion of a molding apparatus used to fabricate a character belt in accordance with the present invention; and FIG. 7 is a simplified cross-sectional view of a molding apparatus used in fabricating the character belt of the present invention.

DESCRIPTION OF THE PREFERRED EMBODIMENTS

Figure 1:
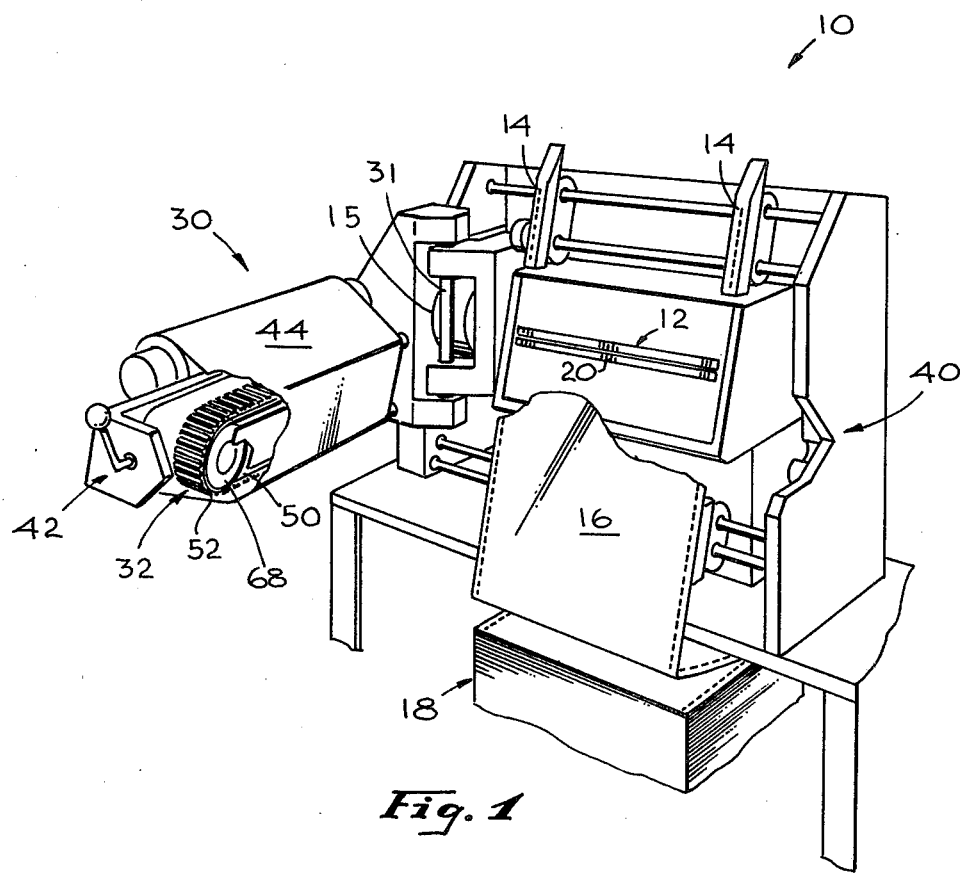
FIG. 1 is a perspective view of a high speed printer incorporating the teachings of the present invention.

Attention is now directed to FIG. 1 which illustrates a high speed impact printer exemplary of the type generally employed for data processing applications. Briefly, the printer of FIG. 1 is comprised of a first frame 10 supporting both a hammer bank assembly 12 and a paper stepping system generally comprised of tractor chains 14, driven by motor 15. The chains 14 pull edge perforated paper 16 from a supply stack 18 past the impact faces 20 of the hammer bank assembly 12. A typical hammer bank assembly is disclosed in U.S. Pat. No. 3,643,595.

The printer of FIG. 1 also includes a second frame 30 which is hinged with respect to the first frame 10 about a hinge pin 31. Cooperating latch mechanisms 40 and 42 are carried respectively by the frames 10 and 30 for locking the frames together in closed operative relationship.

The frame 30 supports a type assembly 32, hereinafter also referred to as the character belt, which includes a moveable type bearing surface which presents successive type characters to the hammer impact faces 20. The present invention is directed primarily to an improved character belt 32 in which the type bearing surface moves horizontally along the line of hammer impact faces. The details of the character belt and the method of fabricating it in accordance with the invention will be discussed hereinafter subsequent to a brief cnsideration of of the operation of the printer of FIG. 1.

In operation, the edge perforations of the paper 16 are engaged with the sprockets of chains 14 and the frame 30 is in a closed latched position with respect to the frame 10. Movement of the chains by the motor 15 pulls the paper past the hammer impact faces 20, one line at a time. In this closed operative position, the hammer impact faces are disposed very close to the paper 16 which in turn is disposed very close to a printing ribbon 44 carried by frame 30 adjacent to the character belt 32. As will be seen hereinafter, as the type surface of the belt 32 is moved, it presents successive type characters to each of the plurality of print stations, i.e., the hammer impact faces. By actuating a hammer at an appropriate time, the hammer impact face is propelled against the back side of the paper 16, forcing the paper against the ribbon 44 and the type surface of belt 32 to thus print the struck character on the front side of the paper.

Figure 2:
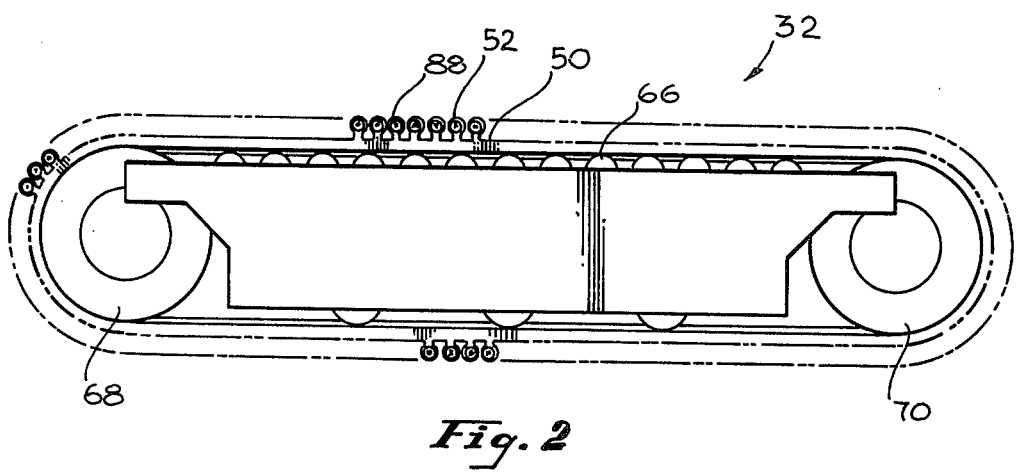
FIG. 2 is a front plan view of a character belt in accordance with the present invention showing the structure on which the belt is supported.

As previously mentioned, the present invention is directed primarily to an improved character belt 32 for successively presenting characters to be printed to the print stations. Briefly the character belt 32 in accordance with the invention is comprised of an endless band 50 supported on a roadbed formed by low friction bearings such as roller bearings. As is disclosed in significantly greater detail in U.S. Pat. No. 3,845,711, and as shown in FIG. 2, the roller bearings 66 bear outwardly against the inner surface of the band 50, with means such as an idler pulley 68 and a drive wheel 70 being provided for driving the band 50 around the roadbed. As can be seen in FIGS. 1 and 2, slugs 52 are carried on the outer surface of the band 50. Each slug 52 carries a type character 88 on at least one end face thereof and as the band 50 is moved around the roadbed along a substantially elliptical path, successive characters on the upper run of the path are presented at each print station.

Attention is now directed to FIGS. 3 and 4 which illustrate one embodiment of the character belt 32 in accordance with the present invention. The character belt 32 includes the endless band 50 having inner and outer peripheral surfaces 72 and 74. Extending from the outer surface 74 are equally spaced projections or platforms 76, each terminating at its outer end, remote from surface 74, in the form of a cylindrical sleeve 78. Each of the sleeves surrounds a slug 52 which is fixedly and permanently secured therein. As will be discussed hereinafter, the band 50, platforms 76 and sleeves 78 are integrally formed, as by a molding process.

As seen in FIG. 4, the opposite outer ends 80 and 82 of each slug 52 extend beyond the sleeve 78 and terminate in end faces 84 and 86 respectively. One or more type characters 88 are defined on one or both end faces 84 and 86. The type slugs are selected so as to have a large mass relative to the mass of the hammer in order to minimize the energy transfer from a hammer to a slug upon impact. Preferably, the mass of each slug will be at least five to ten times the mass of a hammer. In a typical embodiment, the longitudinal axes of the slugs 52 extend substantially parallel to the flight paths of the hammers and the slugs are oriented so as to be struck by the hammer impact faces within 5° of the slug center of gravity. As a consequence, impact tends to displace the slugs in a direction approximately along its longitudinal axis, thereby offering maximum resistance to slug misalignment or interaction between adjacent slugs.

In the preferred embodiment of the invention illustrated in FIGS. 3 and 4, the band 50, the platforms 76 and the sleeves 78 are integrally formed, preferably of a material exhibiting good elastic damping and high abrasion resistant qualities. As will be explained hereinafter, in a preferred method of fabricating the belt, the slugs 52 are prepositioned in a molding fixture so that the sleeves 78 are formed around the slugs during the molding process, thereby securely and permanently bonding the slugs therein.

In order to assure that the band fits properly on the roadbed, it is essential that it have a precisely defined inner diameter which resists stretching. In order to attain these characteristics, a core of high-tensile strength material such as Fiberglass or Kevlar fibers, designated in FIGS. 3 and 4 by numeral 90 is embedded in the band 50. As shown in an alternate embodiment in FIG. 5, the band's inner surface 72 may be shaped to define enlarged end portions 92 and 94 to structurally reinforce the band edges.

Attention is now directed to FIGS. 6 and 7 which illustrate a molding apparatus used in the preferred method of fabricating the above-described embodiments. Briefly, the method consists of first molding an outer band layer with the sleeves 78 and platforms 76 integral therewith and then molding an additional inner band layer onto the inner surface of the outer band to embed core material 90 therebetween.

In FIGS. 6 and 7, numeral 110 designates a circular main ring, only a section of which is shown in FIG. 6. Extending radially outwardly from the ring's inner annular surface 112 are equally spaced cavities 114, each comprising a substantially rectangularly shaped mouth portion 116 from which a cylindrically-shaped cavity portion 118 extends. The diameter of each cavity portion 118 is equal to the outer diameter of the sleeve 78. Also shown in FIG. 6 is a circular plug, hereinafter referred to as plug A, whose radius $R_1$ is less than the radius $R_2$ between the plug center 120 and the ring inner surface 112 to define a channel 121 therebetween of thickness $R_2 - R_1$. The outer periphery of plug A is designated by numeral 122.

A simplified cross-sectional view of a molding apparatus used to mold the band 50, the platforms 76 and the sleeves 78 around the slugs 52 is shown in FIG. 7. The apparatus includes a mold base plate 124, and a lower slug locating ring 126 on which the main ring 110 rests. An upper slug locating ring 130 rests on top of ring 110 with a top slug retaining ring or plate 132 on top of ring 130. The entire assembly is fastened together by bolts (not shown) so that the centers of the various rings or plates coincide with the axis of rotation of a drive shaft 134 which is connected to base plate 124 and is driven by a drive or spinning mechanism 135.

Each of the rings 126 and 130 has a plurality of cylindrical openings 140 which accommodate the opposite end portions 80 and 82 (see FIG. 4) of the slugs 52 which are not to be encased by the sleeves. The radial distance from the center of each of rings 126 and 130 and the center of its opening 140 is precisely equal to the distance between the center of main ring 110 and the center of its cylindrical cavity portions 118. Thus, when the slugs are aligned in the rings 126, 110 and 130, the axis of each slug 52 is aligned with the center of a cylindrical cavity portion 118, with clearance being present between the outer surface of each slug and the inner surface of the cavity portion 118.

The plug A is shown with a large central opening 142. The plug rests on members or bosses 144 which extend from the base plate 124, so that the bottom side of the plug near its periphery is spaced above a top surface of the ring 126 to form a passageway 146 for moldable material in its plastic state to flow and occupy the space between the periphery 122 of plug A and the ring inner surface 112, the cavity portions 116 of ring 110 and the space in cavity portions 118 which are not occupied by the slugs.

The moldable material is poured into opening 142 of plug A. Due to centrifugal forces created when the entire assembly is rotated on drive shaft 134, the moldable material flows outwardly through passageways 146 to fill all of the spaces between the main ring 110 and plug A to form the outer layer of the band 50, the platforms 76 and the sleeves 78. An annular vent chamber 147 is provided to accommodate displaced air and overflow urethane.

The following is a description of a preferred sequence of molding steps to produce the embodiment of the character belt shown in FIGS. 3 and 4.

(1) The slugs 52 are cleaned and primed and assembled in the openings 140 of rings 126 and 130 through the main ring 110.

(2) A strand of Fiberglass or Kevlar (represented in the Figures by numeral 90) is precisely wound and evenly spaced around the plug A.

(3) The plug A is placed in the mold apparatus and the entire assembly is secured together by bolts.

(4) The mold apparatus is heated to about 240° F.

(5) The mold apparatus is rotated slowly and a premeasured, premixed, preheated quantity of uncured liquid urethane is slowly poured into the opening 142 of plug A. The specific type of urethane is selected on the basis of its good elastic damping qualities when cured.

(6) The rotational speed of mold apparatus is increased in increments of about 100 rpm per minute until a final speed of 1200 rpm is reached.

(7) The mold apparatus is rotated at 1200 rpm and at a temperature of 240° F. for about 30 minutes.

(8) Thereafter, the speed is increased to 3500 rpm and the heat source shut off and the mold apparatus permitted to cool to about 120° F.

(9) The rotation of the mold apparatus is stopped. Plug A is then removed, leaving a urethane band of thickness $R_2 - R_1$ and having platforms 76 and sleeves 78 extending from the outer surface thereof. The core material 90 is embedded in the urethane immediately adjacent the inner band surface 103 having a diameter equal to the outer diameter of plug A.

(10) A plug B of a radius smaller than that of plug A by a difference equal to the desired thickness of inner band layer 104 is then inserted into the mold. Plug B is represented by dashed lines B in FIG. 7. It, too, has a central opening 142.

(11) The mold apparatus is then reheated to 240° F.

(12) Step 5 is repeated except that a different plastic material, preferably a high abrasion resistant urethane, is poured into the mold.

(13) Repeat steps 6–8.

(14) Permit the mold apparatus to cool and thereafter disassemble the mold assembly to remove the finished belt.

(15) Post cure the belt at about 210° F. for about 3 hours.

It should be stressed that the above-described steps are exemplary of a preferred process of fabricating the belt 32 with particular materials and a particular mold apparatus. Clearly, the steps would vary when using different materials. For example, for many applications, it may be quite adequate to utilize the same mold material for steps 10–15 as is used in steps 1–9.

The foregoing procedure is identical for the embodiments of both FIGS. 4 and 5 except, of course, that a different plug B is required to fabricate the embodiment of FIG. 5. That is, whereas a solid cylindrical plug B can be used to fabricate the belt of FIG. 4, a plug having reduced diameter end portions must be used to fabricate the embodiment of FIG. 5. Moreover, it is necessary that the plug be collapsible so as to permit it to be withdrawn from the molded band.

In summary, the character belt of the present invention comprises an endless band (50) from which equally spaced platforms (76) extend, each terminating in a cylindrical sleeve (78) which encases at least a portion of a cylindrical slug 52 with a type character 88 on at least one end face 84 thereof. An outer band layer 102 together with the platforms 76 and the sleeves 78 are molded from an elastic damping material in one molding operation in which the sleeves are formed around the slugs. Core material of Fiberglass or Kevlar is embedded in the outer band layer during its formation near its inner surface 103 to assure dimensional stability of the belt. A further inner band layer 104 of material exhibiting high abrasion resistance properties is then molded onto the inner surface of the outer band layer.

Fabrication of a belt in accordance with the method described herein yields a belt having the requisite properties of being relatively flexible about an axis in the place of its band perpendicular to its length and relatively rigid about an axis in the plane of the band parallel to its length.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A process for fabricating a character belt comprised of an endless band of uniform width having inner and outer peripheral surfaces and elongated slugs carried by said band adjacent said outer surface and extending across the width thereof, said method comprising the steps of:

providing a mold fixture having a first substantially cylindrically shaped surface defining a central opening, said first surface being shaped to open into a plurality of elongated axial cavities which extend radially outwardly from said first surface and which are uniformly spaced therearound, and a second substantially cylindrically shaped surface spaced radially inwardly from said first surface to define a channel of substantially uniform thickness therebetween;

positioning a plurality of elongated slugs, each having a peripheral surface and first and second end surfaces, in said plurality of cavities so that each slug peripheral surface is spaced from the cavity wall;

depositing molding material into said fixture; and rotating said fixture to flow said molding material into said channel and said spaces between said slug peripheral surfaces and said cavity walls to form an endless band having inner and outer peripheral surfaces with sleeves extending from said outer peripheral surface around said slug peripheral surfaces and bonding thereto.

2. The process of claim 1 wherein said step of providing said mold fixture further includes providing substantially rectangular openings communicating said first surface with said cavities for forming platforms between said band outer peripheral surface and said sleeves.

3. The process of claim 1 including the further steps of:

winding a high-tensile strength core material around said second surface prior to rotating said fixture; and depositing a second layer of material on the inner peripheral surface of said band to envelope said core material therebetween.

4. The process of claim 3 wherein said second layer of material is different from and more abrasion-resistant than said molding material.

* * * * *